US010282936B2

(12) United States Patent
Barnes

(10) Patent No.: US 10,282,936 B2
(45) Date of Patent: May 7, 2019

(54) METHOD, SYSTEM AND TICKET FOR FACILITATING LOTTERY RELATED ACTIVITIES VIA MOBILE DEVICES

(71) Applicant: GTECH Corporation, Providence, RI (US)

(72) Inventor: James C. Barnes, North Kingston, RI (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 14/427,407

(22) PCT Filed: Sep. 11, 2013

(86) PCT No.: PCT/US2013/059249
§ 371 (c)(1),
(2) Date: Mar. 11, 2015

(87) PCT Pub. No.: WO2014/043226
PCT Pub. Date: Mar. 20, 2014

(65) Prior Publication Data
US 2015/0228148 A1    Aug. 13, 2015

Related U.S. Application Data

(60) Provisional application No. 61/699,395, filed on Sep. 11, 2012.

(51) Int. Cl.
*A63F 9/24*     (2006.01)
*G07F 17/32*    (2006.01)
(Continued)

(52) U.S. Cl.
CPC ..... *G07F 17/3211* (2013.01); *G06Q 20/0453* (2013.01); *G06T 19/006* (2013.01);
(Continued)

(58) Field of Classification Search
CPC ..... G07F 17/32; G07F 17/329; G07F 17/3211
See application file for complete search history.

(56) References Cited

U.S. PATENT DOCUMENTS

2005/0001376 A1*  1/2005  LaPorte ........... A63F 3/0665
                                                         273/269
2006/0079311 A1   4/2006  Nulph
(Continued)

OTHER PUBLICATIONS

Notice of Acceptance, Australian Patent Office, Australian Patent Application No. 2013315553, dated Feb. 8, 2017.
(Continued)

*Primary Examiner* — James S. McClellan
*Assistant Examiner* — Kevin M Carter
(74) *Attorney, Agent, or Firm* — Neal, Gerber & Eisenberg LLP

(57) ABSTRACT

An enhanced lottery media representation object such as a ticket, for example, permits a user to access certain desirable features using a communications device. In embodiments of the present invention, an improved physical lottery ticket is provided with one or more icons, such as code elements or graphic patterns, thereupon to enable a user with a properly enabled device to detect, such as by scanning or photographing the icon, or by maintaining the icon within a field of view, one or more of the icons to reveal one or more enhanced experiences via the device.

22 Claims, 4 Drawing Sheets

(51) Int. Cl.
 G06Q 20/04 (2012.01)
 G06T 19/00 (2011.01)
(52) U.S. Cl.
 CPC ............ *G07F 17/32* (2013.01); *G07F 17/329* (2013.01); *G06T 2200/24* (2013.01)

(56) References Cited

U.S. PATENT DOCUMENTS

| | | | |
|---|---|---|---|
| 2006/0081710 A1* | 4/2006 | Streeter | A63F 3/0685 235/454 |
| 2008/0194323 A1* | 8/2008 | Merkli | A63F 13/02 463/30 |
| 2009/0118006 A1 | 5/2009 | Kelly | |
| 2010/0203943 A1* | 8/2010 | Hughes | G07F 17/32 463/17 |
| 2011/0032078 A1* | 2/2011 | Guziel | G07F 17/3209 340/5.86 |
| 2012/0089468 A1* | 4/2012 | Guziel | G06Q 20/20 705/16 |
| 2012/0122538 A1* | 5/2012 | Pollard | G07F 17/329 463/17 |
| 2012/0122558 A1* | 5/2012 | Lyons | G07F 17/3241 463/25 |
| 2012/0184352 A1* | 7/2012 | Detlefsen | G07F 17/3225 463/25 |
| 2012/0214582 A1* | 8/2012 | Marek | A63F 3/0645 463/29 |
| 2013/0210523 A1 | 8/2013 | Arumugam | |
| 2013/0237304 A1* | 9/2013 | Oakes | G07F 17/32 463/16 |
| 2014/0018155 A1* | 1/2014 | Nelson | G07F 17/3225 463/25 |

OTHER PUBLICATIONS

Response to Examination Report, Australian Patent Application No. 2013315553, dated Dec. 21, 2016.
Patent Examination Report 1, Australian Patent Office, Australian Patent Application No. 2013315553, dated Feb. 27, 2016.
International Search Report and Written Opinion, U S. International Searching Authority, PCT/US13/59249, dated Feb. 10, 2014.
UK Office Action, Patent Application No. GB1506266.7, dated Aug. 9, 2018.

* cited by examiner

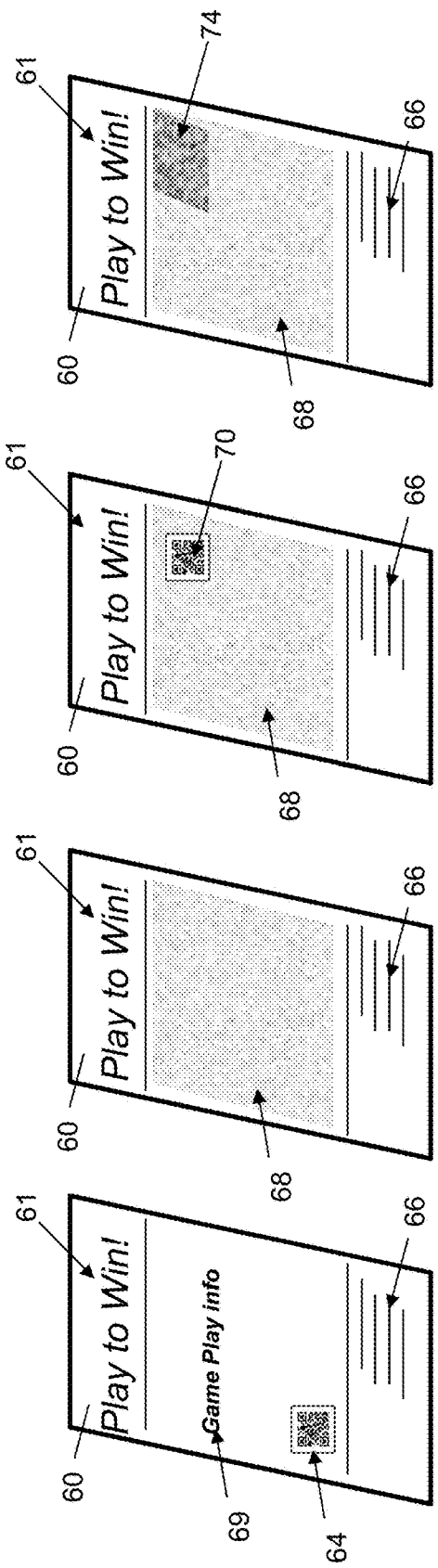

METHOD, SYSTEM AND TICKET FOR FACILITATING LOTTERY RELATED ACTIVITIES VIA MOBILE DEVICES

TECHNICAL FIELD

The present invention relates to lottery offerings, and more particularly to lottery tickets, systems and methods that facilitate lottery-related activities via mobile communications devices.

BACKGROUND ART

Lottery tickets allow players to play both instant and online, or draw-based, lottery games. Over time, lottery games have evolved to provide extended and enhanced play features, such as second chance games and the ability to electronically reveal the result of a game over a network such as the Internet, for example.

SUMMARY OF INVENTION

The present invention provides, in one aspect, an enhanced lottery media representation object such as a ticket, for example, that permits a user to access certain desirable features using a communications device, such as a tablet computer, smartphone or other similar communications device. For example, in one embodiment of the present invention, the present invention provides an improved physical lottery ticket with one or more icons, code elements or graphic patterns printed thereupon to enable a user with a properly enabled mobile device to detect, scan or photograph one or more of the code elements or graphic patterns to reveal one or more enhanced experiences. For example, a user can scan an activation icon in the form of a code or image on a physical lottery ticket and the device's image recognition software can permit the user to access a video, three-dimensional animation or other form of content that enhances the user's experience. In one embodiment of the present invention, the icons can take the form of quick response codes, or QR codes. In another embodiment of the present invention, the ticket may be a scratch-off instant ticket printed with an icon in the form of a recognizable graphic image. In this embodiment, the graphic image can be the only item required to be recognized by the device prior to presenting the visual display of the device with enhanced graphics (e.g., no code reading is required in order to present an augmented reality display on the user's device) or other response. In this embodiment, it is possible to provide standard programming and/or content (e.g., an augmented reality display) to users based on the reading of the graphic design on tickets printed according to the present invention, and then provide an additional display, which may be customized, based upon the device recognizing or scanning another item on the ticket, such as a different activation icon, such as an image, a QR code, and/or other such visual elements provided on the ticket. The additional display can be a unique element such as a supplemental win opportunity for an instant ticket game, for example.

In another embodiment of the present invention, a three-dimensional animation is provided on the communications device display and represented in a way that it appears overlain upon an actual image seen through the camera of the device. Such an animation or other graphical display can be called, for example, "augmented reality". In another embodiment of the present invention, the user's device is provided with a software application that automatically presents the enhanced content on the device screen when the device's camera picks up lottery enhanced media associated with the present invention. It will be appreciated that lottery-related media can include items beyond tickets, such as wager receipts, print advertising, billboards and electronic media, for example. All such lottery-related media can be provided with icons in the form of codes or images, for example, that permit a user to receive enhanced content via their mobile devices in accordance with the present invention. In another embodiment of the present invention, a scratch-off instant ticket which has not been scratched may be printed with an activation icon such as a graphical image or code, for example, whereas a different or enhanced icon may be presented after the ticket has been scratched.

In another aspect, the present invention provides a system and method for associating certain lottery-related content with certain users of devices in order to customize content and add value to the end users. For example, the present invention can provide advertising or promotional videos to be displayed on a user's device upon the user scanning or photographing a code using their device. In one embodiment, the present invention provides customized content to the user's device based upon the user's geo-location. For example, if the user is determined to be near a coffee establishment, the user may be presented with advertising content in an effort to attract the user into the coffee establishment for a purchase. As another example, the present invention can provide enhanced gaming content, such as a video, animation or augmented reality presentation on the user's device based on the user's location. As another example, the present invention can provide second chance games, bonus games, loyalty points and other lottery-related content based upon icons/codes printed on the tickets.

In another aspect, a method of the present invention operates so as to receive a communication from a user's device in the form of a detected, scanned or photographed image from a ticket, determine and retrieve content associated with the image and transmit the content to the user's device. The content can be a video display, an interactive video, a three-dimensional animation, a bonus game, a movie trailer, an advertisement or promotion, and/or other content that facilitates lottery-related activities, for example. It will be appreciated that lottery-related activities can include games, loyalty rewards, commercial advertisements and promotions and other ancillary products that can be provided in connection with lottery games. Other aspects of the present invention are described and shown elsewhere herein.

BRIEF DESCRIPTION OF THE DRAWINGS

FIGS. 4A to 4D show exemplary stages of ticket development of tickets provided in accordance with additional aspects of the present invention.

DESCRIPTION OF EMBODIMENTS

Figure 1:
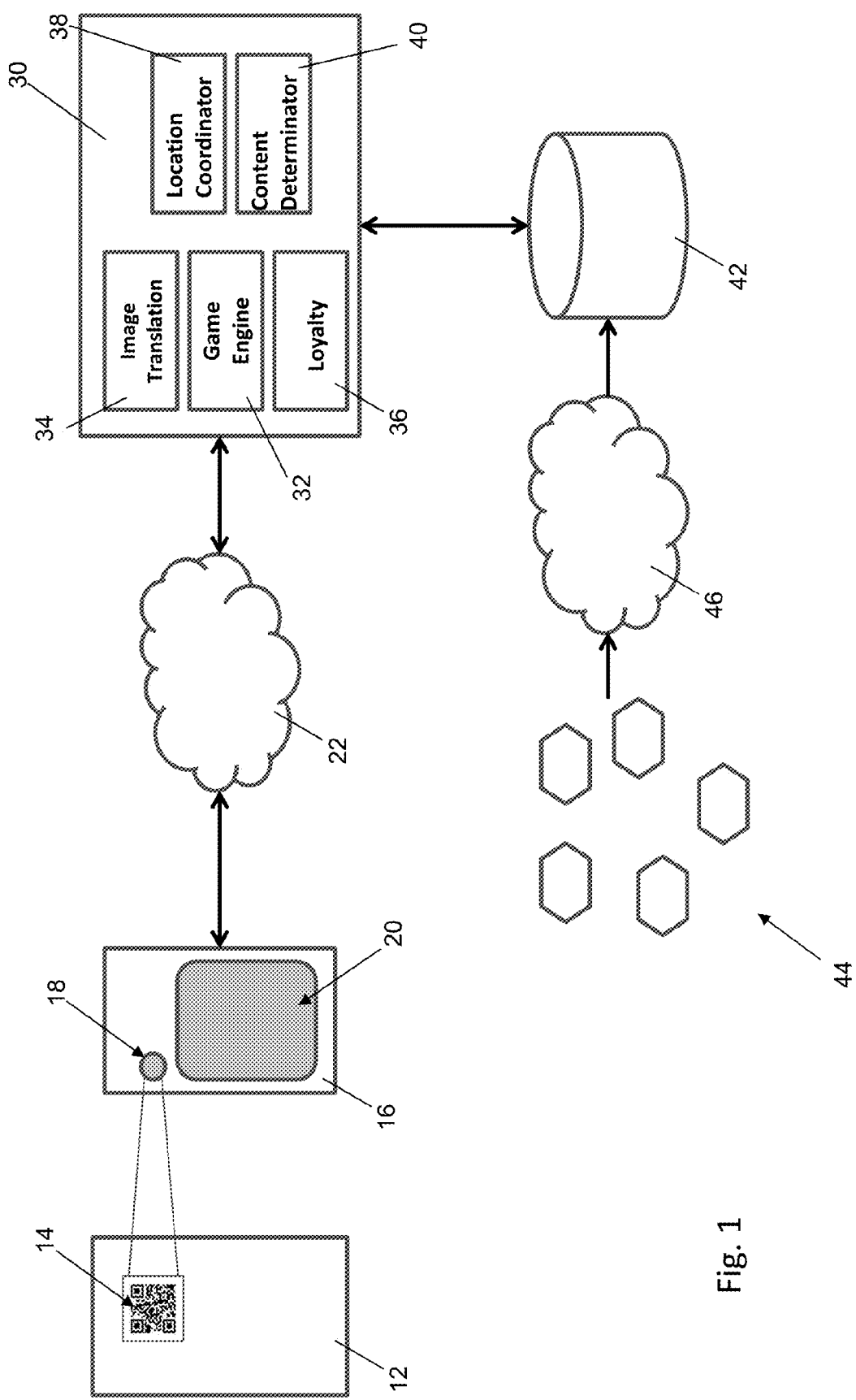
FIG. 1 shows an exemplary schematic diagram illustrating different elements and embodiments of the present invention.
Figure 2B:
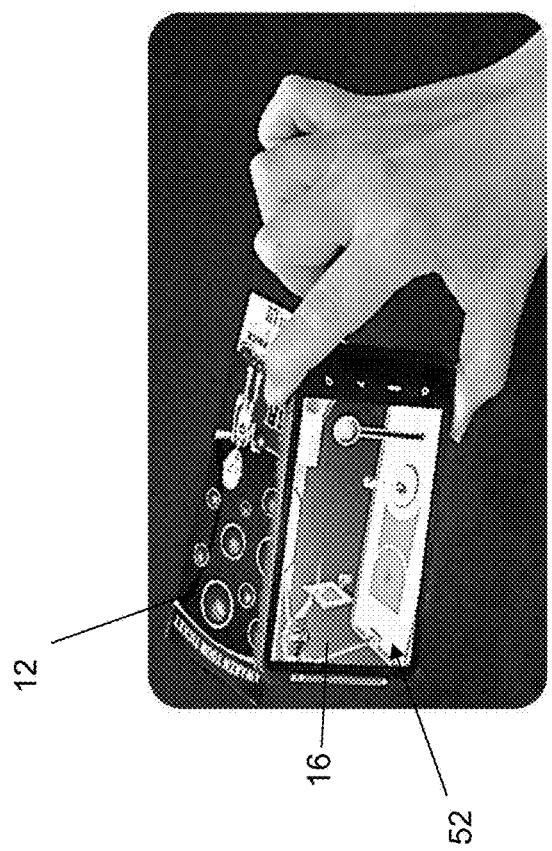
FIGS. 2A and 2B show exemplary graphical depictions on a mobile communications device operating in accordance with one aspect of the present invention.
Figure 2A:
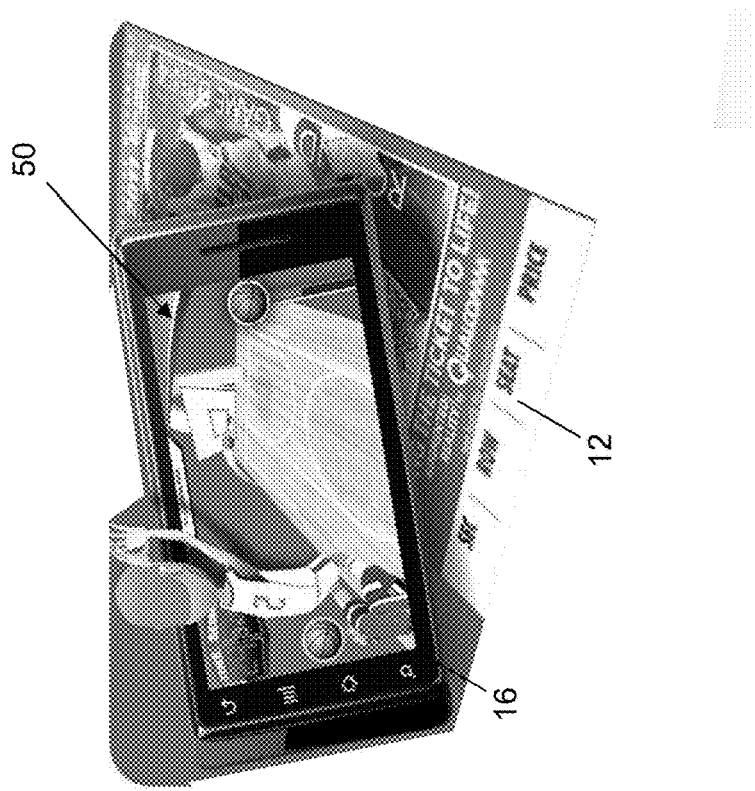

FIGS. 1, 2A and 2B illustrate elements of the device, system and method of the present invention. As shown in FIG. 1, a lottery media representation object 12 is provided with an activation icon 14 imprinted thereon. The lottery media representation object 12 can be, but need not be, a ticket, as disclosed above, and the icon 14 can be a barcode such as a QR code, for example. A communications device 16 is shown and includes sufficient processing and memory capabilities to support programming to support input/output devices such as a camera with lens 18, a display/graphical user interface 20, as well as programming to support image recognition, a lottery software application such as provided in accordance with the present invention and other desirable functions. The device 16 used in accordance with the present invention can thus detect one or more icons 14 from the lottery media element 12, and transmit such codes over a network 22 such as the Internet, for example, to a system component 30 associated with the present invention. Detecting can take many forms, including by scanning or photographing an image of the icon(s), or by keeping the icon(s) within a field of view of a camera element of the device, for example. The system component 30 can include sub-components such as a game engine 32, an image translation component 34, a loyalty component 36, a location coordinator component 38 and a content determinator component 40. The game engine 32 can include software programming for providing games for display on the mobile device 16, and can optionally be tied to a game engine associated with lottery tickets that may be used in connection with the present invention. The image translation component 34 can include software programming for taking image information transferred from the mobile device 16 in order to inform the content determinator component 40 as to what content is appropriate to communicate back to the mobile device 16. The content determinator component 40 can include software programming for receiving information from the image translation component 34, as well as information from the mobile device 16 (e.g., input from a user), and determining appropriate information, content and/or programming to be communicated to the device 16.

The location coordinator component 38 can receive information associated with the imaged code or associated with the device 16 (such as its geo-coordinates, for example) in order to inform the content determinator component 40 as to what content is appropriate to provide back to the device 16. The loyalty component 36 can include software programming for storing, retrieving and tabulating any loyalty rewards that may be associated with user participation with the system of the present invention.

The content database 42 stores content that can be sent to the user device 16 based on determinations made by the content determinator component 40. The stored content can include augmented reality programming, game programming, audio/video/image content and other content that can be sent by the system component 30 to the device 16. Typically, the content is then displayed on the display 20 of the device 16.

It will be appreciated that the present invention can operate such that communications to and from the system component 30 can occur with multiple communications devices at the same time. In various embodiments, the device 16 can be a smartphone, which is generally known to offer more advanced computing capability than a traditional mobile or cellular phone. For example, the device 16 can be provided with sufficient memory, a processor and programming so as to be able to execute third party applications stored in the smartphone memory. In various embodiments, the device 16 can be a tablet computer, such as an iPad™ or Kindle™ product. In embodiments of the present invention, the device 16 is a tablet computer with only a virtual keyboard and/or provisioning for an external keyboard through a wired or wireless connection. It will be appreciated that the device 16 can take other forms, including a wearable computing device, a personal computer, a portable computer such as a laptop or notebook computer, a television, a remote control device and/or a device designed for navigation systems, such as a global positioning device. The device can have input receiving capabilities, such as a microphone, camera, keyboard, gesture recognition software, touchscreen display and other inputs. The device can further have output capabilities, including speakers and display 20. In one embodiment of the present invention, the display is a liquid crystal display (LCD).

In embodiments of the present invention, the device's camera can be provided so as to capture and/or generate still images and/or images in the form of motion video, any of which can be recorded and/or displayed on the device display 20. Further, in embodiments of the present invention, the images captured by the camera can be converted by an image sensor of the camera to an electronic signal, which represents electronic image data that can be processed as described herein. The electronic image data can be processed by image translation component 34 of system component 30. The camera lens 18 can be provided so that it is facing outwardly from the same side of the device as the display (i.e., front facing lens) or facing outwardly from the opposite side of the device as the display (i.e., rear facing lens).

In obtaining the electronic image data, it will be appreciated that the camera of the device can be employed such that the camera captures an image through the lens, such as through the user selecting a camera application and snapping a picture or recording a video. Further, the present invention can operate whereby the camera application of the device 16 is selected by the user and the mere manipulation of the device such that an activation icon appears within the field of view of the lens 18 (without images being recorded by the user as in a photograph or recorded video) is sufficient to capture electronic image data for further processing as described herein.

The present invention can operate such that electronic image data from the camera can be used to display an augmented reality display on the device 16 using lottery media. As described above, the camera lens in operation with the camera can detect an activation icon on a lottery media representation object. This detection can be from a snapshot or recorded video, or can be by manipulating the device 16 such that the icon and lottery media are within the camera's field of view. The obtained image data is manipulated by software programming associated with the camera and stored on the device so as to convert the raw image data to electronic image data. The electronic image data is used to generate, on the display 20 of the communications device 16, an augmented reality display. FIGS. 2A and 2B illustrate exemplary augmented reality displays 50 and 52, respectively, as appearing on a device 16. In these embodiments, the device 16 has a camera lens facing outwardly from the opposite side of the device as the display, such that the camera contains at least a portion of the lottery media representation object 12 within the camera field of view. In one embodiment of the present invention, the augmented reality display (e.g., 50, 52) is associated with programming from an augmented reality (AR) data source. The AR data source can be maintained by the communications device 16, or can be maintained by a server associated with system component 30. For example, AR data source 42 is an example of a data source maintained by system component 30. Additionally, the device 12 can have its own internal image translation component and content determinator component (not shown), such that communications with component 30 are unnecessary to produce AR displays as described herein.

The lottery media representation object 12 can be, for example, a lottery ticket; a digital image, or a non-lottery ticket physical image, such as a poster, sign, advertisement or other physical item. A digital image version of the lottery media representation object can be, for example, a graphical user interface associated with a computer or a stand-alone terminal in a gaming establishment, for example. In one embodiment of the present invention, the computer can be outside of a gaming establishment, such as in a player's home, for example.

In various embodiments of the present invention, once the activation icon is read by the camera of the device, the associated AR display presented by the device on the device display can comprise a lottery game enhancement. For example, the lottery game enhancement can be a bonus game associated with a primary game on a lottery ticket acting as the lottery media representation object. For instance, if the lottery ticket is an instant ticket having a game requiring a player to match player numbers with winning numbers on the ticket, the bonus game provided by the lottery game enhancement can require the player to initiate a particular action or provide particular input in order to play the bonus game. The bonus game may or may not be related to the primary game. In one embodiment of the present invention, the bonus game can require that a player make a wager.

In this regard, the augmented reality display facilitates the receiving, by the mobile communications device, of the user input. Such facilitation can come in the form of a user touching the display touchscreen at a certain location corresponding to a portion of the AR display. For example, the AR display may have a portion that includes wording stating "Place a wager on the bonus game" or "Change the display" or "Make selections". Alternatively, the AR display can have a portion that includes a visual icon that the user is required to touch in order to take action, win points, win a game, etc. The different actions that can be prompted using the AR display are numerous in accordance with the present invention. In various embodiments of the present invention, the user input can assist in determining the outcome of a game, or in determining the display of the outcome of a game.

In embodiments of the present invention, a player's input as facilitated by the AR display can be processed locally by the mobile device or by the system component 30 via network 22. For example, the player's input from the device 12 can be sent to system component, which can centrally store and process the input. In one embodiment of the present invention, the player's input is processed by the game engine 32, so that a game outcome is determined (e.g., a primary game outcome or a bonus game outcome). In another embodiment of the present invention, the player's input is processed by the loyalty component 36 in order to effectuate any loyalty points earned or redeemed by player as a results of the player's input. The player's input can directly earn loyalty points, redeem loyalty points, or provide input for a game, which if the player is successful, earns loyalty points.

It will be appreciated that a player's input as the player interacts with the AR display need not necessarily be communicated to system component 30. For example, a player's input can be processed by the device 16 and appropriate additional action taken in accordance with the present invention.

Other lottery game enhancements can be provided as well. For example, the AR display can provide content that improves chances for success for the underlying lottery ticket. As a specific example, if a player is playing an instant ticket requiring that the player scratch up to three spots out of a larger field to find a particular indicia (e.g., a treasure chest) in order to win, the AR display can show the player where one treasure chest exists, thereby improving the player's overall chances of winning. In one embodiment of the present invention, the player may be required to pay money or redeem loyalty points in order to obtain content that improves the player's chances for success. In one embodiment of the present invention, the player may be required to indicate agreement to purchase the lottery game enhancement, or redeem loyalty points, prior to the enhancement being displayed on the device display 20. Another lottery enhancement provided in accordance with embodiments of the present invention can be a specific game subject enhancement. For example, if a lottery ticket game has a particular theme or subject, the lottery game enhancement can be relevant to that theme or subject. As shown in FIGS. 2A and 2B, the underlying lottery media representation object 12 pertains to basketball, and the device display 20 showing the lottery game enhancement 50, 52 also pertains to basketball. In other various embodiments of the present invention, a game subject enhancement can include substantially real-time information obtained by the mobile communications device. Such information can be a live score from a sporting contest, a live or taped representation of a horse race, game statistics for a fantasy sports team or other information. In one embodiment of this aspect of the present invention, the substantially real-time information is obtained from the system component 30, while in another embodiment of the present invention, the information is obtained from a separate source, such as a news feed, Twitter™ post, mobile web site or other source.

In various embodiments of the present invention, the device can receive a player input to a lottery game enhancement. For example, the lottery game enhancement can be a particular sports game display, and the player can elect to display a different team of the displayed sport, or a different sports game altogether. In one embodiment of the present invention, the player can swipe the touch screen display to cycle through different displays, and the different displays can be provided according to the displays that are available from a given AR display data source. The AR display data source can be stored in the device 12 or in system component 30, for example. In addition to changing the displayed lottery game enhancement, the player can provide input to the device to augment or supplement the lottery game enhancement. Thus, instead of changing a display, the present invention can receive and process a user's request to supplement the display, upon which the mobile communication device can process the request and obtain additional data from a given AR display data source depending upon the implementation of the present invention. For example, if the displayed lottery game enhancement shows a basketball court, the player may request that the display include a closer view of the basket and rim, upon which the player makes a corresponding input (for example by touching a zoom icon, or by spreading the fingers out in a motion on a touch screen display).

Additional lottery game enhancement input responses can be received and processed. For instance, the present invention can receive an input from a user in response to a lottery game enhancement to purchase one or more lottery tickets, designate a lottery game enhancement as a favorite, record a still photograph of the lottery game enhancement, record a video of the lottery game enhancement or manipulate the display of the lottery game enhancement.

The lottery game enhancement can be determined based upon a location of the mobile communications device, in accordance with one embodiment of the present invention. Further, the lottery game enhancement can be an advertisement.

Figure 3A:
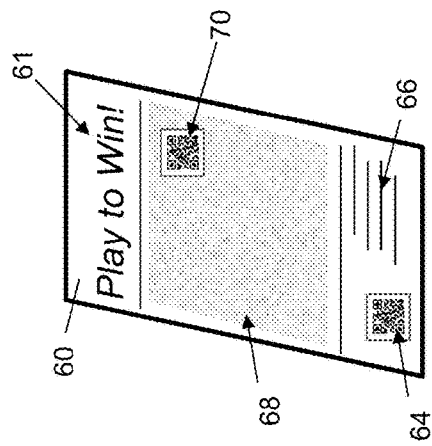
FIGS. 3A to 3F show exemplary stages of ticket development of tickets provided in accordance with aspects of the present invention.
Figure 3B:
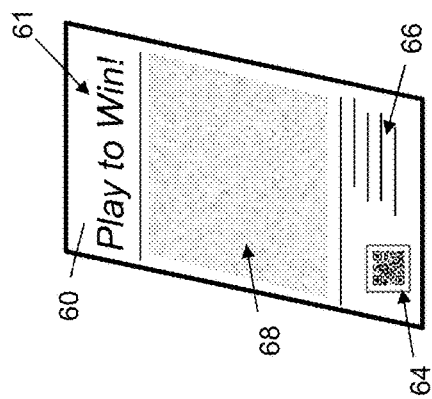
Figure 3C:
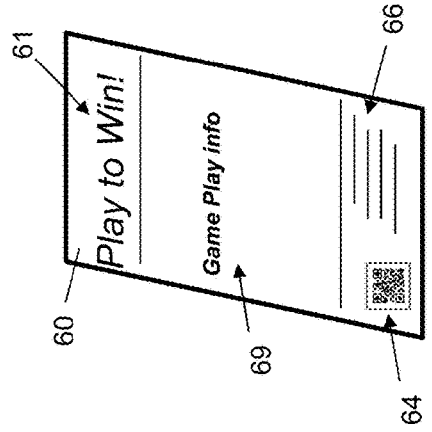
Figure 3D:
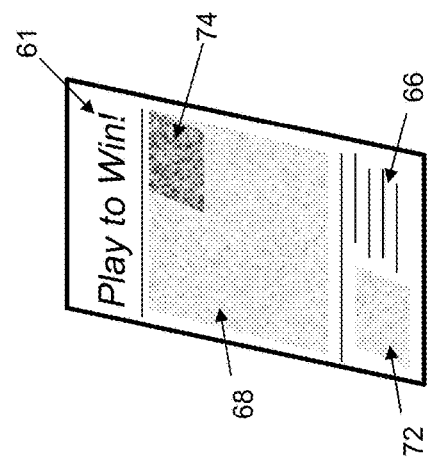
Figure 3E:
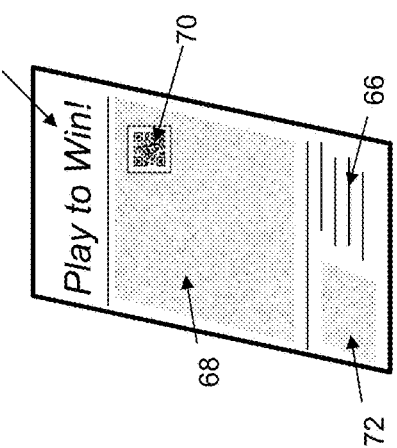
Figure 3F:
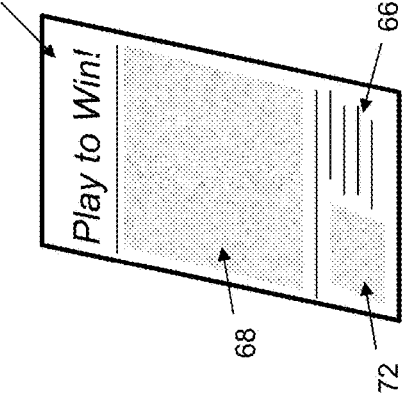

In various embodiments of the present invention, more than one activation icon can appear on a lottery media representation object, such that a first lottery game enhancement is provided upon detection of a first icon, and a second lottery game enhancement is provided upon detection of a second icon. For example, as shown in the embodiments of FIGS. 3A through 3F and FIGS. 4A through 4D, a lottery ticket 60 can be provided as a substrate with material printed thereon, including artwork and game titles 61, instructions for playing 66, and a game play area 69 containing game play information, which can be in the form of player selections, player numbers, winning numbers and/or other game play information. In various embodiments of the present invention, a lower level activation icon 64 can be placed, printed or otherwise positioned in place on the base level of the printed substrate, below or adjacent any scratch-off material. Then, latex or other suitable and appropriate scratch-off material 68 can be printed or otherwise secured atop the substrate. Scratch-off material is typically provided as part of the game play, such that a player can scratch areas of the ticket to see if the ticket is a winner. Scratch-off material can also be provided above a validation number or other material on the game as required. As shown in FIGS. 4B through 4D, the scratch-off material 68 is provided so as to cover the lower level activation icon. As shown in FIGS. 3B and 3C, the scratch-off material 68 is provided so as not to cover the lower level activation icon 64. As shown in FIGS. 3D through 3F, secondary scratch-off material 72 is provided so as to cover the lower level activation icon 64, while the primary scratch-off material 68 covers at least a portion of the game play information in the game play area 69.

In various embodiments of the present invention, after one or more scratch-off layers 68, 72 are applied to the ticket 60, an upper layer activation icon 70 can be printed on the ticket substrate, and this upper layer icon 70 can be printed atop the scratch-off layer 68 as shown in FIGS. 3C, 3E and 4C, or in another location of the ticket that does not have scratch-off material on it, such as adjacent material 68, but wherein the location is viewable by the lens 18 of the device 16 without scratching off the scratch-off layer 68. In such embodiments, the present invention can operate such that a first lottery game enhancement is provided via the display 20 of the device when the device's camera detects the upper layer icon 70, and a second lottery game enhancement is provided via the display when the camera detects the lower layer icon 64, after the scratch-off layer above the lower layer icon, if any, is removed. As shown in FIGS. 3A through 3C, there is no scratch-off layer applied above the lower layer icon 64. As shown in FIGS. 3D through 3F, a secondary scratch-off layer 72 is applied above the lower layer icon 64. As shown in FIGS. 4A through 3D, primary scratch-off layer 68 is applied above the lower layer icon 64, in addition to at least a portion of the game play area 69. Further, as shown in FIGS. 3F and 4D, a tertiary scratch-off layer 74 is applied above the upper layer icon 70, which is itself applied on top of the primary scratch-off layer 68. In this embodiment of the present invention, the player must first scratch off or otherwise remove layer 74 to reveal icon 70 in order to view the second lottery game enhancement, and then remove the scratch off layer (72 in FIGS. 3F and 68 in FIG. 4D) in order to reveal icon 64 to view the first lottery game enhancement. The first and second lottery game enhancements in these embodiments of the present invention can be related to the same game, or the same subject matter as provided on the ticket (e.g., treasure hunt, sports game, etc.). In various embodiments of the present invention, the first and second lottery game enhancement can be sequential parts of a game associated with the ticket. For instance, when the device's camera detects the upper layer icon 70 in FIGS. 3C, 3E and/or 4E, the device can display an initial enhancement, and when the device's camera detects the lower layer icon 64, the device can display a subsequent enhancement.

In various embodiments of the present invention, it will be appreciated that a finished ticket available for purchase can be provided with zero, one or two (or more) activation icons viewable at the time of purchase. Two viewable icons are shown in FIG. 3C, for example. Alternatively, only the upper layer icon 70 may be viewable at the time of purchase, as shown in FIGS. 3E and 4C, for example. Alternatively, only a lower layer icon 64 may be viewable at the time of purchase, as shown in FIG. 3B, for example. In one embodiment of the present invention, if the device's camera detects both icons 64, 70 at the same time, no enhancement is provided via the device's display. In this way, overlapping or possibly conflicting enhancements are prevented from being displayed. In another embodiment of the present invention, the first enhancement (e.g., from the upper layer icon 70) must be viewed before the second enhancement (e.g., from the lower layer icon 64) will be permitted to be displayed. In this way, any pre-ordered or required sequence of enhancements can be preserved. For example, it may be desired that a player view enhancements in a particular order because viewing the enhancements out of order may nullify the game, provide inaccurate information, provide unhelpful information or otherwise be improper or inappropriate. In another embodiment of the present invention, once the scratch-off material 68 is removed, the icon 70 is removed with it.

In one embodiment of the present invention, the AR display can be a combination of actual world features and augmented reality features generated on the display that do not exist in the actual world. For instance, the displays 50, 52 in FIGS. 2A and 2B, respectively, can include images from the underlying ticket 12 as well as generated displays that do not appear on the underlying ticket.

As shown in FIG. 1, it will be appreciated that the content database 42 can be updated, changed and/or supplemented with content from third parties 44 in accordance with one embodiment of the present invention. For example, commercial partners may change their commercial offerings or advertisements, game providers may change their game offerings, and video or augmented reality animations can be updated as necessary over time. Such updates and changes can occur as third parties 44 access the database 42 through network 46, which can be a private or public network, such as the Internet, for example.

In carrying out the above, it will be appreciated that the system of the present invention can comprise a computer-based system, where the components can be implemented in hardware, software, firmware, or combinations thereof.

It will be appreciated that the system of the present invention as implemented in the device 16 itself, or as implemented as system component 30, or as implemented as a combination or sub-combination of the device 12, system component 30 and representation object 12, can incorporate necessary processing power and memory for storing data and programming that can be employed by the processor(s) to carry out the functions and communications necessary to facilitate the processes and functionalities described herein. Each computing device 12 can be configured to communicate with the system component 30 described herein. Appropriate encryption and other security methodologies can also be employed by the system of the present invention, as will be understood to one of ordinary skill in the art.

Unless otherwise stated, devices or components of the present invention that are in communication with each other do not need to be in continuous communication with each other. Further, devices or components in communication with other devices or components can communicate directly or indirectly through one or more intermediate devices, components or other intermediaries. Further, descriptions of embodiments of the present invention herein wherein several devices and/or components are described as being in communication with one another do not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media.

Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, with programmed steps of the method of the invention for execution by a processing unit. Aspects of the present invention may be embodied in a non-transitory computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example. Appropriate hardware, software and programming for carrying out computer instructions between the different elements and components of the present invention are provided.

The present disclosure describes numerous embodiments of the present invention, and these embodiments are presented for illustrative purposes only. These embodiments are described in sufficient detail to enable those skilled in the art to practice the invention, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by way of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

The invention claimed is:

1. A method, comprising:
   detecting, via a camera of a mobile communications device, a first activation icon on a lottery media representation object, wherein the camera has a field of view;
   generating, on a display of the mobile communications device, an augmented reality ("AR") display when the camera contains at least a portion of the lottery media representation object within the camera field of view, wherein the augmented reality display is associated with programming from an AR data source, and wherein the augmented reality display comprises a first lottery game enhancement comprising a three-dimensional animation display overlain upon an image of the lottery media representation object; and
   receiving an input, via the three-dimensional animation display, in response to the first lottery game enhancement, wherein the AR data source has a plurality of available displays, and wherein the input in response to the first lottery game enhancement results in one of: a display change to an available display from the AR data source that is different from the first lottery game enhancement, and a display supplement to the first lottery game enhancement.

2. The method of claim 1 wherein the AR data source is maintained by the mobile communications device.

3. The method of claim 1 wherein the AR data source is maintained by a server in communication with the mobile communications device via a network.

4. The method of claim 1 wherein the lottery media representation object is one of: a lottery ticket; a digital image, and a non-lottery ticket physical image.

5. The method of claim 1 wherein the received input assists in determining the outcome of a game.

6. The method of claim 1 wherein the received input assists in determining the display of the outcome of a game.

7. The method of claim 1 wherein the first lottery game enhancement is a bonus game.

8. The method of claim 1 wherein the first lottery game enhancement further comprises content that improves chances of success for a game.

9. The method of claim 1 wherein the lottery media representation object comprises a game subject, and wherein the first lottery game enhancement further comprises a game subject enhancement.

10. The method of claim 9 wherein the game subject enhancement includes substantially real-time information obtained by the mobile communications device.

11. A method, comprising,
   generating, on a display of a mobile communications device comprising a camera with a field of view, an augmented reality ("AR") display when the camera contains at least a portion of a lottery media representation object within the field of view, wherein the augmented reality display is associated with programming from an AR data source, and wherein the augmented reality display comprises a first lottery game enhancement comprising a three-dimensional animation display overlain upon an image of the lottery media representation object;
   receiving an input, via the three-dimensional animation display, in response to the first lottery game enhancement to reveal an outcome of a game; and
   receiving, via the mobile communications device, an input to record a video of the first lottery game enhancement.

12. The method of claim 1 wherein the first lottery game enhancement is determined based upon a location of the mobile communications device.

13. The method of claim 1 wherein the first lottery game enhancement further comprises an advertisement.

14. A method, comprising:
   detecting, via a camera of a mobile communications device, a first activation icon on a lottery media representation object, wherein the camera has a field of view;
   generating, on a display of the mobile communications device, an augmented reality ("AR") display when the camera contains at least a portion of the lottery media representation object within the camera field of view, wherein the augmented reality display is associated with programming from an AR data source, and wherein the augmented reality display comprises a first lottery game enhancement comprising a three-dimensional animation display overlain upon an image of the lottery media representation object;
   receiving an input, via the three-dimensional animation display, in response to the first lottery game enhancement to reveal an outcome of a game;
   detecting, via the camera of the mobile communications device, a second activation icon on the lottery media representation object; and
   generating, on the display of the mobile communications device, a second lottery game enhancement.

15. The method of claim 14, wherein the second augmented reality display cannot be displayed prior to the display of the first augmented reality display.

16. A non-transitory computer program product comprising computer program code for instructing one or more processors of a mobile communications device, wherein the mobile communications device comprises a camera and a display, wherein the one or more processors executes the computer program code upon the camera detecting an image of an activation icon printed on a lottery media representation object, whereby an augmented reality display comprising first and second lottery game enhancements are caused to be displayed on the display of the mobile communications device so as to appear overlain upon an image of the lottery media representation object, wherein the second lottery game enhancement is caused to be displayed upon receipt of an input via the mobile communications device display to change the first lottery game enhancement when the first lottery game enhancement is caused to be displayed on the mobile communications device display.

17. The method of claim 1, wherein the first lottery game enhancement has been designated as a favorite by a user of the communications device.

18. The method of claim 1 wherein the input in response to the lottery game enhancement reveals an outcome of a game.

19. The non-transitory computer program product of claim 16, wherein the one or more processors executes the computer program code upon receipt of an input via the augmented reality display to reveal an outcome of a game.

20. The non-transitory computer program product of claim 19, wherein at least one of the first and second lottery game enhancements comprises content that improves chances of success for the game.

21. A gaming system server, comprising:
   a processor; and
   a memory storing a plurality of instructions, which when executed by the processor, cause the processor to:
      in response to receiving a first communication from a mobile communications device upon a camera of the mobile communications device detecting an activation icon on a lottery media representation object, retrieve first content comprising an augmented reality display;
      transmit the first content comprising the augmented reality display to the mobile communications device for display on a display of the mobile communications device, wherein the augmented reality display comprises a three-dimensional animation display to be overlain upon an image of the lottery media representation object;
      in response to receiving a second communication from the mobile communications device upon the mobile communications device displaying the three-dimensional animation display and receiving an input, via the three-dimensional animation display, in response to the three-dimensional animation display, retrieve second content; and
      transmit the second content to the mobile communications device for display on the display of the mobile communications device, wherein the second content comprises one of: a display change that is different from the three-dimensional animation display, and a display supplement to the three-dimensional animation display.

22. A gaming system server, comprising:
   a processor; and
   a memory which stores a plurality of instructions, which when executed by the processor, cause the processor to:
      in response to receiving a first communication from a mobile communications device upon a camera of the mobile communications device detecting an activation icon on a lottery media representation object, retrieve first content comprising an augmented reality display, wherein the augmented reality display comprises a first lottery game enhancement;
      transmit the first content to the mobile communications device for display on a display of the mobile communications device;
      in response to receiving a second communication from a mobile communications device, wherein the second communication comprises an input via the mobile communications device display to change the first lottery game enhancement when the first lottery game enhancement is displayed on the mobile communications device display, retrieve second content comprising a second lottery game enhancement; and
      transmit the second content to the mobile communications device for display on the display of the mobile communications device.

* * * * *